(12) United States Patent
Abusleme et al.

(10) Patent No.: US 9,382,362 B2
(45) Date of Patent: Jul. 5, 2016

(54) FLUOROPOLYMER-BASED HYBRID ORGANIC/INORGANIC COMPOSITES

(75) Inventors: Julio A. Abusleme, Varese (IT); Riccardo Pieri, Milan (IT); Ivan Pagin, Bergamo (IT)

(73) Assignee: SOLVAY SPECIALTY POLYMERS ITALY S.PA., Bollate (Milan) (IT)

( * ) Notice: Subject to any disclaimer, the term of this patent is extended or adjusted under 35 U.S.C. 154(b) by 293 days.

(21) Appl. No.: 13/638,425
(22) PCT Filed: Mar. 31, 2011
(86) PCT No.: PCT/EP2011/055019
§ 371 (c)(1),
(2), (4) Date: Sep. 28, 2012
(87) PCT Pub. No.: WO2011/121078
PCT Pub. Date: Oct. 6, 2011

(65) Prior Publication Data
US 2013/0023620 A1 Jan. 24, 2013

(30) Foreign Application Priority Data
Apr. 2, 2010 (EP) ................................. 10159063

(51) Int. Cl.
*C08F 20/06* (2006.01)
*C08F 214/18* (2006.01)
(Continued)

(52) U.S. Cl.
CPC .......... *C08F 214/18* (2013.01); *B01D 67/0079* (2013.01); *B01D 69/148* (2013.01);
(Continued)

(58) Field of Classification Search
None
See application file for complete search history.

(56) References Cited

U.S. PATENT DOCUMENTS 6,193,955 B1 * 2/2001 Yamana et al. .................. 424/45
6,548,590 B1 * 4/2003 Koloski .................... C08K 9/08
524/104
(Continued)

FOREIGN PATENT DOCUMENTS

EP 0811669 A1 10/1997
EP 1389634 A1 2/2004
(Continued)

OTHER PUBLICATIONS

Ogoshi, Tomoki, et al—"Synthesis of poly(vinylidene fluoride) (PVdF)/Silica Hybrids Having Interpenetrating Polymer Network Structure by Using Crystallization Between PVdF Chains", 2005, Journal of Polymer Science Part A : Polymer Chemistry, vol. 43, Issue No. 16, pp. 3543-3550, Wiley Periodicals Inc.; 8 pgs.
(Continued)

*Primary Examiner* — Robert C Boyle

(57) ABSTRACT

A process for manufacturing a fluoropolymer hybrid organic/inorganic composite comprising:
(i) mixing at least one fluoropolymer comprising recurring units derived from at least one (meth)acrylic monomer [monomer (MA)] of formula:

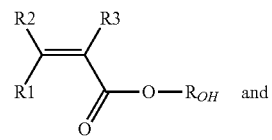

at least one metal compound [compound (M)] of formula: $X_{4-m}AY_m$,
wherein each of R1, R2, R3, equal or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group [polymer (F)];
wherein m is an integer from 1 to 4, A is a metal selected from the group consisting of Si, Ti and Zr, Y is a hydrolysable group, X is a hydrocarbon group comprising one or more functional groups;
(ii) reacting at least a fraction of hydroxyl groups of the $R_{OH}$ groups of said monomer (MA) of said polymer (F) with at least a fraction of said compound (M), to obtain a grafted polymer comprising pendant —$Y_{m-1}AX_{4-m}$ groups, with m, Y, A and X having same meaning as above; and
(iii) hydrolyzing and/or polycondensing compound (M) and/or pendant —$Y_{m-1}AX_{4-m}$ groups as above. The invention also disclose the fluoropolymer hybrid organic/inorganic composites obtained therefrom and the method of the use of the same.

20 Claims, 1 Drawing Sheet

(51) Int. Cl.

| | |
|---|---|
| C08F 8/00 | (2006.01) |
| C09D 127/16 | (2006.01) |
| C08J 5/00 | (2006.01) |
| C08J 5/22 | (2006.01) |
| B01D 67/00 | (2006.01) |
| B01D 69/14 | (2006.01) |
| B82Y 30/00 | (2011.01) |
| C08F 220/06 | (2006.01) |
| C08F 220/20 | (2006.01) |
| C08F 214/22 | (2006.01) |
| C08F 214/24 | (2006.01) |
| C08K 3/34 | (2006.01) |
| H01M 2/14 | (2006.01) |
| H01M 2/16 | (2006.01) |
| H01M 8/10 | (2016.01) |
| B01D 71/02 | (2006.01) |
| B01D 71/34 | (2006.01) |
| B01D 71/70 | (2006.01) |

(52) U.S. Cl.
CPC .............. *B82Y 30/00* (2013.01); *C08F 8/00* (2013.01); *C08F 214/182* (2013.01); *C08F 214/186* (2013.01); *C08J 5/005* (2013.01); *C08J 5/2281* (2013.01); *C09D 127/16* (2013.01); *B01D 71/022* (2013.01); *B01D 71/027* (2013.01); *B01D 71/34* (2013.01); *B01D 71/70* (2013.01); *B01D 2323/38* (2013.01); *C08F 214/225* (2013.01); *C08F 214/245* (2013.01); *C08F 220/06* (2013.01); *C08F 220/20* (2013.01); *C08F 2800/10* (2013.01); *C08F 2810/20* (2013.01); *C08F 2810/50* (2013.01); *C08J 2333/10* (2013.01); *C08K 3/346* (2013.01); *H01M 2/145* (2013.01); *H01M 2/166* (2013.01); *H01M 8/1046* (2013.01); *Y02P 70/56* (2015.11)

(56) References Cited

U.S. PATENT DOCUMENTS

| | | | |
|---|---|---|---|
| 6,620,516 B1 * | 9/2003 | Kurihara et al. | ............ 428/447 |
| 6,710,123 B1 | 3/2004 | Amin-Sanayei et al. | |
| 7,244,797 B2 | 7/2007 | Kurihara et al. | |
| 2005/0049381 A1 * | 3/2005 | Yamahiro | ............ C08G 77/388 528/10 |

FOREIGN PATENT DOCUMENTS

| | | |
|---|---|---|
| JP | 11005951 A1 | 1/1999 |
| JP | 11209624 A | 8/1999 |
| JP | 11310720 A | 11/1999 |
| JP | 2004-250560 A1 | 9/2004 |
| WO | WO 9407947 A1 | 4/1994 |
| WO | 96/26254 A1 | 8/1996 |

OTHER PUBLICATIONS

Souzy Renaud, et al—"Functional fluoropolymers for fuel cell membranes", 2005, Progress in Polymer Science, vol. 30, Issue No. 6, pp. 644-687, Elsevier Ltd.; 44 pgs.

Sanchez Clement, et al—"Optical Properties of Functional Hybrid Organic-Inorganic Nanocomposites", 2003, Advanced Materials, vol. 15, Issue No. 23, pp. 1969-1994, Wiley-VCH Verlag GmbH & Co. KGaA, Weinheim; 26 pgs.

* cited by examiner

FLUOROPOLYMER-BASED HYBRID ORGANIC/INORGANIC COMPOSITES

CROSS-REFERENCED TO RELATED APPLICATIONS

This application is a U.S. national stage entry under 35 U.S.C. §371 of International Application No. PCT/EP2011/055019 filed Mar. 31, 2011, which claims priority to European application No. 10159063.6 filed on Apr. 2, 2010, the whole content of this application being incorporated herein by reference for all purposes.

TECHNICAL FIELD

The invention pertains to certain fluoropolymer-based hybrid organic/inorganic composites with chemical bonds between the inorganic domains and the fluoropolymer phase, to a method for its manufacture, and to several uses and applications of the same.

BACKGROUND ART

Hybridization at the nanometer scale organic and inorganic compounds is an important and evolutionary way to create new materials. Organic-inorganic polymer hybrids, wherein organic polymers are dispersed in inorganic solids on a nano or molecular level, have raised a great deal of scientific, technological and industrial interests because of their unique properties.

To elaborate organic-inorganic polymer hybrids, a sol-gel process using metal alkoxides is the most useful and important approach. By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds. The polymer can enhance the toughness and processability of otherwise brittle inorganic materials, wherein the inorganic network can enhance scratch resistance, mechanical properties, and surface characteristics of said hybrid.

Hybrids made from sol-gel technique starting from fluoropolymers, in particular from vinylidene fluoride polymers are known in the art.

Thus, paper OGOSHI, Tomoki, et al. Synthesis of Poly(vinylidene fluoride) (PVDF)/Silica Hybrods having interpenetrating polymer network structure by using crystallization between PVDF chains. (A) *J. polym. sci., A, Polym. chem.* 2005, vol. 43, p. 3543-3550. discloses the synthesis of certain PVDF/silica hybrids by reacting a solution in DMF and gamma-butirolactone of PVDF with TMOS in the presence of a catalytic amount of HCl.

Nevertheless, despite the in situ formation of the inorganic domains which should provide for high dispersion-ability, it happens that these interface among organic phase and inorganic phase represent disrupting surfaces which might behave as weakness points depleting advantages in mechanical properties, and/or might cause inorganic domain to 'coagulate' to a large extent depleting the homogeneity advantages, e.g. in adhesion and/or other surface properties.

Attempts have been made in the art for ensuring chemical bonding among certain organic polymers and certain inorganic domains dispersed therein, via techniques differing from the sol/gel above mentioned.

Thus, U.S. Pat. No. 6,620,516 (ASAHI KASEI KK) 16, Sep. 2003 discloses an organic domain/inorganic domain hybrid material wherein the organic domain comprises a water-soluble or water-dispersible organic polymer having a plurality of carboxylic acid groups, and the organic domain and the inorganic domain being ionically bonded to each other through the carboxylic groups of the organic polymer to form an ionically crosslinked structure. These hybrids are manufactured by reaction between the organic polymer as above detailed and certain metasilicate anions in an aqueous medium under basic conditions in the presence of certain divalent metal cations which will ensure the formation of the ionic network through simultaneous ionic chemical bond to the carboxylate and silicate groups.

Similarly, U.S. Pat. No. 7,244,797 (ASAHI KASEI KK) 17, Jul. 2007 discloses a similar approach, wherein, in addition, the organic polymer can comprise cationic functionalities (e.g. quaternary ammonium groups) which are ionically bound to the metasilicate function of the inorganic domain.

Nevertheless, these approaches have not been proposed as suitable for fluoropolymers.

SOUZY, Renaud, et al. Functional Fluoropolymers for fuel cell membranes. *Prog. Polym. Sci.* 2005, vol. 30, p. 644-687. discloses in its section 3.3.2 composite membrane notably made by formation of an interpenetrating network of the organic and inorganic fractions. As an example, sol-gel acid-catalyzed hydrolysis/polymerization of tetraethoxysilane (TEOS) on NAFION® pre-formed fluoroionomer membrane is mentioned as yielding a Nafion®-silica hybrid membrane.

EP 1389634 A (DAIKIN INDUSTRIES LTD) 18, Feb. 2004 discloses a surface-treatment agent comprising:
a) a hydrolyzable metal alkoxyde, which can be notably TEOS;
b) a fluorocompound comprising a perfluoroalkyl group and a functional group reactive towards the above mentioned metal hydrolyzable compound; and
c) an adhesion improvement agent.

In preferred embodiments, compound b) is a perfluoropolyether comprising functional groups of formula:

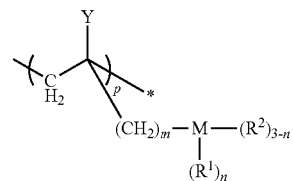

wherein Y is H or lower alkyl group; m and n is from 0 to 2; R1 is a hydrolysable group or a chlorine atom; R2 is a hydrogen atom or a inert monovalent group, M is a metal or a reactive group selected from the group consisting of an isocyanate group, a carboxyl group, a hydroxyl group, a glycidyl group, a phosphate group, an amino group, and a sulfonate group.

There is thus still a shortfall in the art for fluoropolymer-based hybrid organic/inorganic composites wherein organic phases and inorganic phases are chemically bound each other through covalent bounds, which could override drawbacks of hybrids of the prior art.

DISCLOSURE OF INVENTION

Figure 1:
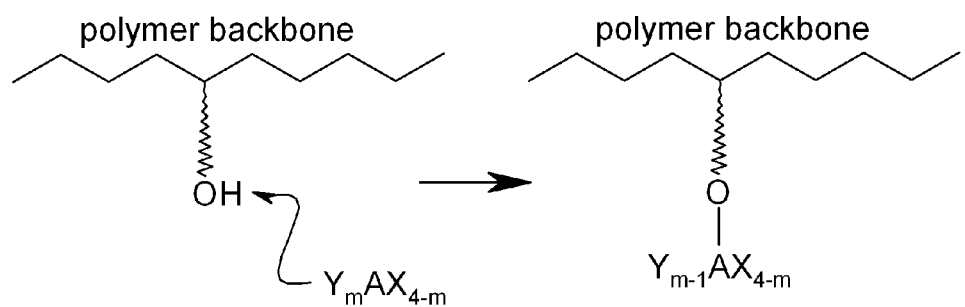
FIG. 1 is a scheme showing reaction of a hydroxyl group of the $R_{OH}$ group of a monomer (MA) of a polymer (F) with a compound (M) of formula $X_{4-m}AY_m$, wherein m is an integer from 1 to 4, A is a metal selected from the group consisting of Si, Ti and Zr, Y is a hydrolysable group, X is a hydrocarbon group, optionally comprising one or more functional groups, so as to obtain a grafted polymer comprising pendant —$Y_{m-1}$ $Ak_{4-m}$ groups, with m, Y, A and X having same meaning as above detailed.

The invention thus provides a process for manufacturing a fluoropolymer hybrid organic/inorganic composite, said process comprising:
(i) providing a mixture of:
at least one fluoropolymer comprising recurring units derived from at least one (meth)acrylic monomer [monomer (MA)] of formula:

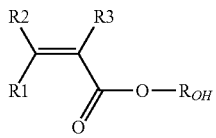

wherein each of R1, R2, R3, equal or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group [polymer (F)]; and
at least one metal compound [compound (M)] of formula:

wherein m is an integer from 1 to 4, and, according to certain embodiments, from 1 to 3, A is a metal selected from the group consisting of Si, Ti and Zr, Y is a hydrolysable group, X is a hydrocarbon group, optionally comprising one or more functional groups;
reacting at least a fraction of hydroxyl groups of the $R_{OH}$ groups of said monomer (MA) of said polymer (F) with at least a fraction of said compound (M), so as to obtain a grafted polymer comprising pendant —$Y_{m-1}$ $AX_{4-m}$ groups, with m, Y, A and X having same meaning as above detailed;
hydrolyzing and/or polycondensing compound (M) and/or pendant —$Y_{m-1}AX_{4-m}$ groups, as above detailed to yield a fluoropolymer hybrid organic/inorganic composite comprising inorganic domains.

Further, the invention pertains to a fluoropolymer hybrid organic/inorganic composite comprising inorganic domains, said hybrid being obtained by reaction between:
at least one polymer (F), as above detailed; and
at least one compound (M), as above detailed,
wherein the inorganic domains are grafted to the polymer (F) through reaction of at least a fraction of the $R_{OH}$ groups of the monomer (MA) with at least a fraction of compound (M).

It has been surprisingly found that fluoropolymer hybrid organic/inorganic composites of the present invention exhibit improved properties, in particular, with regards to adhesion to glass or ceramic materials, and/or with regards to their enhanced scratch resistance. Also, wherein a functional compound (M) is used, fluoropolymer hybrid organic/inorganic composites are obtained which can exhibit functional behaviour, for instance in terms of hydrophilicity or ion conductivity.

Polymer (F) of the invention is a fluoropolymer, i.e. a polymer comprising, in addition to recurring units derived from monomer (MA), recurring units derived from at least one ethylenically unsaturated monomer comprising at least one fluorine atom.

The term "at least one (meth)acrylic monomer (MA)" is understood to mean that the polymer (F) may comprise recurring units derived from one or more than one (meth)acrylic monomer (MA) as above described. In the rest of the text, the expressions "(meth)acrylic monomer (MA)" and "monomer (MA)" are understood, for the purposes of the present invention, both in the plural and the singular, that is to say that they denote both one or more than one (meth)acrylic monomer (MA).

Polymer (F) comprises preferably at least 0.05, more preferably at least 0.1, even more preferably at least 0.2% moles of recurring units derived from said monomer (MA).

Polymer (F) comprises preferably at most 10, more preferably at most 7.5% moles, even more preferably at most 5% moles, most preferably at most 3% moles of recurring units derived from said monomer (MA).

Determination of average mole percentage of (MA) monomer recurring units in polymer (F) can be performed by any suitable method. Mention can be notably made of acid-base titration methods, well suited e.g. for the determination of the acrylic acid content, of NMR methods, adequate for the quantification of (MA) monomers comprising aliphatic hydrogens in side chains, of weight balance based on total fed (MA) monomer and unreacted residual (MA) monomer during polymer (F) manufacture.

The hydrophilic (meth)acrylic monomer (MA) preferably complies formula:

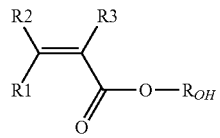

wherein each of R1, R2, $R_{OH}$ have the meanings as above defined, and R3 is hydrogen; more preferably, each of R1, R2, R3 are hydrogen, while $R_{OH}$ has the same meaning as above detailed.

Non limitative examples of hydrophilic (meth)acrylic monomers (MA) are notably acrylic acid, methacrylic acid, hydroxyethyl(meth)acrylate, hydroxypropyl(meth)acrylate; hydroxyethylhexyl(meth)acrylates.

The monomer (MA) is more preferably selected among:
hydroxyethylacrylate (HEA) of formula:

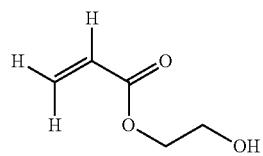

2-hydroxypropyl acrylate (HPA) of either of formulae:

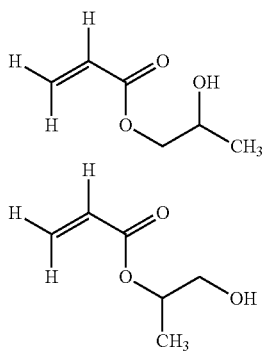

acrylic acid (AA) of formula:

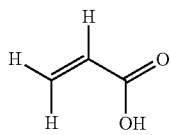

and mixtures thereof.

Most preferably, the monomer (MA) is HPA and/or HEA.

More preferably, the polymer (F) of the invention is a hydrogen-containing fluoropolymer comprising, in addition to recurring units derived from monomer (MA), as above detailed:

recurring units derived from at least one ethylenically unsaturated monomer comprising at least one fluorine atom (fluorine-containing monomer), different from monomer (MA); and recurring units derived from at least one ethylenically unsaturated monomer comprising at least one hydrogen atom (hereinafter, hydrogen-containing monomer), different from monomer (MA).

The fluorine-containing monomer and the hydrogen-containing monomer may be the same monomer or may be different monomers.

Non limitative examples of suitable fluorinated comonomers are notably:

$C_3$-$C_8$ perfluoroolefins, such as tetrafluoroethylene, and hexafluoropropene;

$C_2$-$C_8$ hydrogenated fluoroolefins, such as vinyl fluoride, 1,2-difluoroethylene, vinylidene fluoride and trifluoroethylene;

perfluoroalkylethylenes complying with formula $CH_2$=$CH$—$R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2$=$CFOR_{f1}$ in which $R_{f1}$ is a $C_1$-$C_6$ fluoro- or perfluoroalkyl, e.g. $CF_3$, $C_2F_5$, $C_3F_7$;

$CF_2$=$CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoroalkylvinylethers complying with formula $CF_2$=$CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$;

functional (per)fluoro-oxyalkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles.

Non limitative examples of suitable hydrogen-containing monomers are notably:

$C_2$-$C_8$ hydrogenated fluoroolefins, such as vinyl fluoride, 1,2-difluoroethylene, vinylidene fluoride and trifluoroethylene;

perfluoroalkylethylenes complying with formula $CH_2$=$CH$—$R_{f0}$, in which $R_{f0}$ is a $C_1$-$C_6$ perfluoroalkyl;

non-fluorinated monomers such as ethylene, propylene, vinyl monomers such as vinyl acetate, acrylic monomers, like methyl methacrylate, butyl acrylate, as well as styrene monomers, like styrene and p-methylstyrene.

Polymer (F) comprises preferably more than 1% mol, preferably more than 5% mol, more preferably more than 10% mol of recurring units derived from the hydrogen-containing monomer.

Polymer (F) comprises preferably more than 25% mol, preferably more than 30% mol, more preferably more than 40% mol of recurring units derived from the fluorine-containing monomer.

The fluorine-containing monomer can further comprise one or more other halogen atoms (Cl, Br, I). Should the fluorine-containing monomer be free of hydrogen atom, it is designated as per(halo)fluoromonomer. Should the fluorine-containing monomer comprise at least one hydrogen atoms, it is designated as hydrogen-containing fluorinated monomer.

Should the fluorine-containing monomer be a hydrogen-containing fluorinated monomer, such as for instance vinylidene fluoride, trifluoroethylene, vinylfluoride, the hydrogen-containing fluoropolymer of the invention can be either a polymer comprising, in addition to recurring units derived from monomer (MA), recurring units derived only from said hydrogen-containing fluorinated monomer, or it can be a copolymer comprising recurring units derived from said monomer (MA), said hydrogen-containing fluorinated monomer and from at least one other monomer.

Should the fluorine-containing monomer be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from said monomer (MA), recurring units derived from said per(halo)fluoromonomer and from at least one other hydrogen-containing monomer different from said monomer (MA), such as for instance ethylene, propylene, vinylethers, acrylic monomers, vinylidene fluoride, trifluoroethylene, vinylfluoride.

Preferred polymers (F) are those wherein the fluorine-containing monomer is chosen from the group consisting of tetrafluoroethylene (TFE), vinylidene fluoride (VDF) and chlorotrifluoroethylene (CTFE).

Most preferably, polymer (F) of the present invention is selected from the group consisting of:

(F-1) polymers comprising recurring units derived from monomer (MA), from at least one per(halo)fluoromonomer selected from TFE and CTFE, and from at least one hydrogenated comonomer selected from ethylene, propylene and isobutylene, optionally containing one or more additional comonomers, typically in amounts of from 0.1 to 30% by moles, based on the total amount of TFE and/or CTFE and said hydrogenated comonomer(s);

(F-2) VDF polymers comprising recurring units derived from monomer (MA), from VDF, and, optionally, from one or more fluorine-containing monomer(s) different from VDF.

In polymers (F-1) as above detailed typically the molar ratio per(halo)fluoromonomer(s)/hydrogenated comonomer(s) is of from 30:70 to 70:30.

In polymers (F-1), the hydrogenated comonomer preferably comprises ethylene, optionally in combination with other hydrogenated comonomers.

Polymers of (F-1) type wherein the per(halo)fluoromonomer is predominantly or CTFE only will be identified herein below as ECTFE copolymers; polymers of (F-1) type wherein the per(halo)fluoromonomer is predominantly or TFE only will be identified herein below as ETFE copolymers.

The ECTFE and ETFE copolymers (F-1) preferably comprise:
(a) from 35 to 65%, preferably from 45 to 55%, more preferably from 48 to 52% by moles of ethylene (E);
(b) from 65 to 35%, preferably from 55 to 45%, more preferably from 52 to 48% by moles of at least one of chlorotrifluoroethylene (CTFE) and tetrafluoroethylene (TFE) or mixture thereof;
(c) from 0.05 to 10%, preferably from 0.1 to 7.5%, more preferably from 0.2 to 5.0% by moles of monomer (MA).

Among F-1 polymers, ECTFE polymers are preferred.

The VDF polymers (F-2) preferably comprise:
(a') at least 60% by moles, preferably at least 75% by moles, more preferably at least 85% by moles of vinylidene fluoride (VDF);
(b') optionally from 0.1 to 15%, preferably from 0.1 to 12%, more preferably from 0.1 to 10% by moles of a fluorinated comonomer chosen among vinylfluoride (VFX), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c) from 0.05 to 10%, preferably from 0.1 to 7.5%, more preferably from 0.2 to 3.0% by moles of monomer (MA).

The compound (M) of formula $X_{4-m}AY_m$ can comprise one or more functional groups on any of groups X and Y, preferably on at least one group X.

In case compound (M) comprises at least one functional group, it will be designated as functional compound (M); in case none of groups X and Y comprises a functional group, compound (M) will be designated as non-functional compound (M).

Mixtures of one or more functional compound (M) and one or more non-functional compound (M) can be used in the process of the invention and in the manufacture of the hybrid composite of the invention. Otherwise functional compound(s) (M) or non-functional compound(s) (M) can be separately used.

Functional compounds (M) can advantageously provide for hybrid composites having functional groups, so that further modifying the chemistry and the properties of the hybrid composite over native polymer (F) and native inorganic phase.

To this aim it is generally preferred that any of groups X of compound (M) of formula $X_{4-m}AY_m$ comprises one or more functional group.

The selection of the hydrolysable group Y of the compound (M) is not particularly limited, provided that it enables in appropriate conditions formation of a —O-A≡ bond; said hydrolysable group can be notably a halogen (especially a chlorine atom), a hydrocarboxy group, a acyloxy group, a hydroxyl group.

The metal compound [compound (M)] preferably complies with formula:

wherein m' is an integer from 1 to 4, and, according to certain embodiments, from 1 to 3, E is a metal selected from the group consisting of Si, Ti and Zr, R' and R", equal to or different from each other and at each occurrence, are independently selected from $C_{1-18}$ hydrocarbon groups, optionally comprising one or more functional groups.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

With the aim of manufacturing fluoropolymer hybrid organic/inorganic composites which can exhibit functional behaviour in terms of hydrophilicity or ion conductivity, functional group of compound (M) will be preferably selected among carboxylic acid group (in its acid, ester, amide, anhydride, salt or halide form), sulphonic group (in its acid, ester, salt or halide form), hydroxyl group, phosphoric acid group (in its acid, ester, salt, or halide form), amine group, and quaternary ammonium group; most preferred will be carboxylic acid group (in its acid, ester, amide, anhydride, salt or halide form) and sulphonic group (in its acid, ester, salt or halide form).

The metal compound [compound (M)] preferably complies with formula:

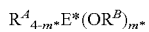

wherein m* is an integer from 2 to 3, E* is a metal selected from the group consisting of Si, Ti and Zr, $R^A$, equal to or different from each other at each occurrence, is a $C_{1-12}$ hydrocarbon group, optionally comprising one or more functional group; RB, equal to or different from each other at each occurrence, is a $C_1$-$C_5$ linear or branched alkyl radical, preferably RB is methyl or ethyl.

Examples of functional compounds (M) are notably vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyltrimethoxysilane) of formula:

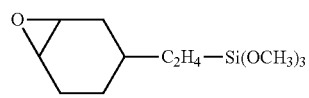

glycidoxypropylmethyldiethoxysilane of formula:

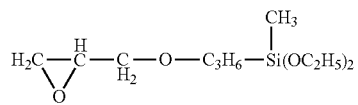

glycidoxypropyltrimethoxysilane of formula:

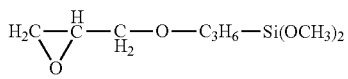

methacryloxypropyltrimethoxysilane of formula:

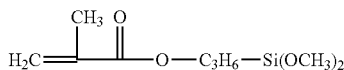

aminoethylaminpropylmethyldimethoxysilane of formula:

aminoethylaminpropyltrimethoxysilane of formula:

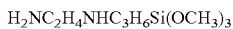

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

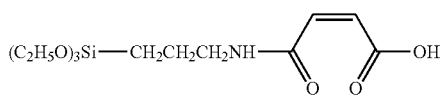

3-(trihydroxysilyl)-1-propane-sulphonic acid of formula $HOSO_2—CH_2CH_2CH_2—Si(OH)_3$, N-(trimethoxysilylpropyl)ethylene-diamine triacetic acid, and its sodium salts, 3-(triethoxysilyl)propylsuccinic anhydride of formula:

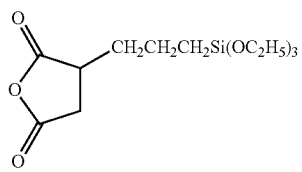

acetamidopropyltrimethoxysilane of formula $H_3C—C(O)NH—CH_2CH_2CH_2—Si(OCH_3)_3$, alkanolamine titanates of formula $Ti(A)_x(OR)_y$, wherein A is an amine-substitued alkoxy group, e.g. $OCH_2CH_2NH_2$, R is an alkyl group, and x and y are integers such that x+y=4.

Examples of non-functional compounds (M) are notably triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

The process of the invention comprises reacting at least a fraction of hydroxyl groups of $R_{OH}$ groups of said monomer (MA) of said polymer (F) with at least a fraction of said compound (M), so as to obtain a grafted polymer comprising pendant $—Y_{m-1}AX_{4-m}$ groups, with m, Y, A and X having same meaning as above detailed.

It is understood that —OH groups of the $R_{OH}$ functionalities of monomer (MA) are able to react with the hydrolysable group(s) of the compound (M) so as to yield a covalent bond between the compound (M) moiety and the monomer (MA) moiety, as notably sketched in the scheme of FIG. 1.

For reacting hydroxyl groups of polymer (F) with compound (M) as above described, several techniques can be successfully used.

Polymer (F) and compound (M) can be notably reacted in the molten state; melt compounders such as extruders, melt kneaders or other devices can be advantageously used to this aim.

Polymer (F) and compound (M) can be also notably reacted in solution; according to this embodiment polymer (F) and compound (M) are at least partially dissolved in a solvent. Dissolution can be obtained either at room temperature or upon heating. The selection of this solvent is not critical, provided that it efficiently solvates both polymer (F) and compound (M) and does not interfere with the reaction between the hydroxyl groups of polymer (F) and the hydrolysable groups of compound (M).

Generally, polar aprotic solvent will be preferably selected. Among these solvents, mention can be notably made of N,N-dimethylformamide (DMF), N,N-dimethylacetamide, tetramethylurea, dimethylsulfoxide (DMSO), triethylphosphate, N-methyl-2-pyrrolidone (NMP), acetone, tetrahydrofuran, methylethylketone (MEK), methylisobutylketone (MIBK), glycol diethers, glycol ether-esters, n-butylacetate, cyclohexanone, diisobutylketone, butyrolactone, isophorone, propylene carbonate, glyceryl triacetate, dimethyl phthalate.

According to an embodiment of the invention, the mixture can further comprise, in addition to compound (M) and polymer (F), at least one inorganic filler.

The inorganic filler is generally provided in the mixture under the form of particles.

The inorganic filler particles generally have an average particles size of 0.001 μm to 1000 μm, preferably of 0.01 μm to 800 μm, more preferably of 0.03 μm to 500 μm.

The choice of the inorganic filler is not particularly limited; nevertheless, inorganic fillers having on their surface reactive groups towards compound (M) are generally preferred.

Among surface reactive group, mention is notably made of hydroxyl groups.

Without being bound by this theory, the Applicant believes that reaction between at least a fraction of compound (M) with at least a fraction of said surface reactive group of the inorganic filler can occur simultaneously with the reaction of at least a fraction of compound (M) with at least a fraction of the $R_{OH}$ groups of the monomer (MA), so that in subsequent hydrolysis/polycondensation step, chemical bonding between the polymer (F) and the inorganic filler is likely achieved through the inorganic domains derived from compound (M).

Among inorganic fillers suitable for being used in the process of the invention, mention can be made of inorganic oxides, including mixed oxydes, metal sulphates, metal carbonates, metal sulfides and the like.

Among metal oxides, mention can be made of $SiO_2$, $TiO_2$, ZnO, $Al_2O_3$.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates are generally known as possessing a layered structure.

These silicates, aluminium-silicates and magnesium silicates, all optionally containing additional metals such as sodium, potassium, iron or lithium can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium can be selected among synthetic clays, like notably fluorohectorite, hectorite, laponite.

Best results have been obtained with particles of layered silicates, aluminium-silicates and magnesium silicates as above described having at least one dimension of less than 100 nm, preferably of less than 50 nm, more preferably of less than 10 nm.

According to this embodiment, fluoropolymer hybrid organic/inorganic composites of the invention comprise said inorganic fillers. Said inorganic fillers are typically comprised in the inorganic domains of the composite of the invention.

The process further comprises hydrolyzing and/or polycondensing compound (M) and/or pendant $—Y_{m-1}AX_{4-m}$ groups, as above detailed to yield a fluoropolymer hybrid organic/inorganic composite comprising inorganic domains.

The hydrolysis/polycondensation can be carried out simultaneously to the step of reacting hydroxyl groups of polymer (F) and compound (M) or can be carried out once said reaction has occurred.

Typically, in particular for compounds wherein A=Si, this hydrolysis/polycondensation is initiated by addition of appropriate catalyst/reactant. Generally, water or a mixture of water and an acid can be used for promoting this reaction.

The choice of the acid is not particularly limited; both organic and inorganic acids can be used. HCl is among the preferred acids which can be used in the process of the invention.

In case of reaction between polymer (F) and compound (M) in the molten state, injection of water vapour, optionally in combination with a volatile acid, will be the preferred method for promoting the hydrolysis/polycondensation.

In case of reaction between polymer (F) and compound (M) in solution, addition of an aqueous medium preferably comprising an acid will be the preferred method for promoting the hydrolysis/polycondensation.

While this hydrolysis/polycondensation can take place at room temperature, it is generally preferred to carry out this step upon heating at a temperature exceeding 50° C.

In case of reaction in the molten state, temperatures will range from 150 to 250° C. as a function of the melting point of the polymer (F); in case of reaction in solution, temperatures will be selected having regards to the boiling point of the solvent. Generally temperatures between 50 and 150° C., preferably between 60° C. and 120° C. will be preferred.

Figure 2:
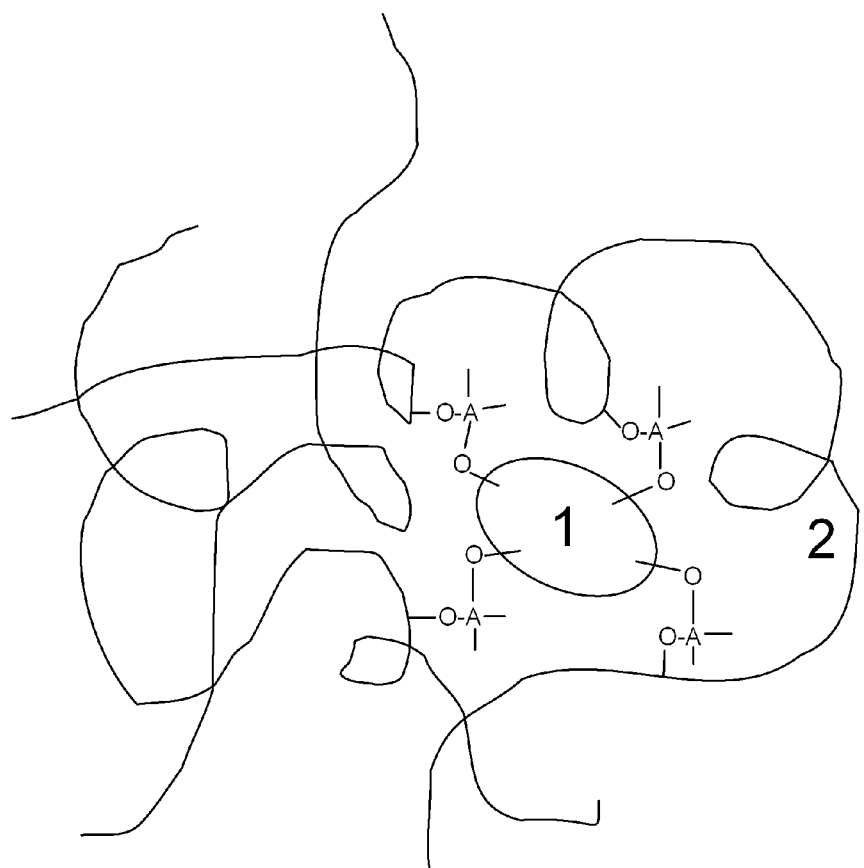
FIG. 2 is a simplified sketch of a hybrid composite comprising polymer domain (2) consisting of chains of polymer (F) and inorganic domains (1) consisting of residues derived from compound (M).

It is understood that in this step, hydrolysable group(s) of the compound (M) will react so as to yield a hybrid composite comprising polymer domain (2) consisting of chains of polymer (F) and inorganic domains (1) consisting of residues derived from compound (M), as notably sketched in the scheme of FIG. 2.

The fluoropolymer hybrid organic/inorganic composite comprising inorganic domains can be recovered from standard methods, which will depend upon techniques used in various reaction steps.

Also other aspects of the invention pertain to the use of the fluoropolymer hybrid organic/inorganic composites of the present invention in different fields of use.

According to one aspect of the present invention, the fluoropolymer hybrid organic/inorganic composites of the present invention are used for the treatment of glass and/or ceramic materials. In particular, the invention pertains to the use of said composite comprising coating a glass and/or a ceramic surface with a layer comprising said composite. Said layer comprising the inventive composite can be used as aesthetic finish, in particular possibly in admixture with pigments or other fillers, or can be used as shatterproof coating.

Still under the scope of this embodiment is the use of said composite for manufacturing multilayer structures comprising a glass and/or ceramic substrate bound to a fluoropolymer layer through a layer comprising the composite as above defined.

Still the composite of the invention can be used as a coating on different substrates for conferring scratch resistance. While the selection of materials which can be successfully coated with the composite of the invention is not particularly limited, it is generally understood that plastic materials will be preferred.

Further, composites of the present invention, in particular those composites which are obtained by reaction between polymer (F) and a functional compound (M) can be used as raw materials for the manufacture of membranes for electrochemical applications and/or for separation processes. In particular, preferred composites for this use are those wherein the functional compound (M) used for their manufacture comprise a functional group selected from the group consisting of carboxylic acid group (in its acid, ester, amide, anhydride, salt or halide form), sulphonic group (in its acid, ester, salt or halide form), hydroxyl group, phosphoric acid group (in its acid, ester, salt, or halide form), amine group, and quaternary ammonium group; preferably from the group consisting of carboxylic acid group (in its acid, ester, amide, anhydride, salt or halide form) and sulphonic group (in its acid, ester, salt or halide form). Within this embodiment, inventive composites can be used for the manufacture of separators for Lithium batteries, for manufacturing ion-conductive membranes for fuel cells, for manufacturing membranes for filtration.

Further, composites of the present invention, in particular those composites which are obtained by reaction between polymer (F) and a functional compound (M) can be used as electroluminescent materials in photovoltaic or organic light emitting devices.

In particular, preferred composites for this use are those wherein the functional compound (M) used for their manufacture comprise a functional group having electro-optic properties, such as notably hole transport capabilities, electron transport capabilities, chromophores and the like. Among these groups, mention can be made of functional groups comprising carbazoles, oxadiazoles, tetraphenylenetetramine, dicyanomethylene-4-H-pyran, naphtalimide groups.

In this case, the use of composites of the present invention in the field of optics exploit combination of properties such as transparency, good adhesion, barrier properties, corrosion protection, easy tuning of refractive index, adjustable mechanical properties and decorative properties.

An extensive review of possible uses of the composites of the present invention made from functional compound (M) comprising a functional group having electro-optic properties is provided in SANCHEZ, Clement, et al. "Optical Properties of Functional Hybrid Organic-Inorganic Nanocomposites'. *Advanced Materials*. Mar. 12, 2003, vol. 15, no. 23, p. 1969-1994.

Still, composites of the present invention can be used for coating surfaces comprising superficial hydroxyl groups; in this case, application of the composite can be performed during the hydrolysis/polycondensation phase so as to have compound (M) possibly establishing a chemical bond with the surface to be coated. Cellulose-based surfaces can be notably used within this approach so as to yield corresponding coated surfaces comprising the composite of the invention. Among substrates suitable as substrates, mention can be made of textiles, fabrics (e.g. for clothing), wood parts ('e.g. for furniture), paper (e.g. for packaging).

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

Preparative Example 1

Step i) Manufacture of a VDF-HEA Copolymer

In a 80 liters reactor equipped with an impeller running at a speed of 300 rpm were introduced in sequence the following ingredients:

Demineralized water: 52335 g;
Suspending agent 17.9 g (Methocel K100GR from DOW Chemical).

Reactor was evacuated and pressurized with 1 bar of N2. Hydroxyethylacrylate (HEA) (21.5 g) was introduced in the reactor, followed by 136 g of a solution of t-amyl perpivalate in isododecane (75% wt concentration), and 22646 g of VDF. The reactor was then gradually heated until set-point temperature of 52° C., corresponding to a pressure of 120 bar, which was maintained constant by feeding an aqueous solution of HEA (20 g/l).

After 590 minutes, and having loaded 15 l of the HEA aqueous solution, polymerization was stopped by venting the reactor. The polymer was collected by filtration, suspended in deionized water and filtered again. After oven-drying at 50° C., 18.3 Kg of a VDF-HEA copolymer, having a HEA content of 1.1% moles and having a melt index of 11.7 g/10 min (230° C./5 Kg) were obtained.

Step ii) Manufacture of a Hybrid VDF-HEA/Silica Composite 1.8 grams of the copolymer powder obtained from step i) were dissolved in 16.2 grams of N-methylpyrrolidone (NMP). Then, 0.693 grams of TEOS were added drop-wise to the stirred solution, followed by 0.333 ml of aqueous HCl (0.1 M); the mixture was stirred at 60° C. for 2 hours to ensure the sol-gel reaction (TEOS hydrolysis and polycondensation) so as to obtain a clear solution of a hybrid VDF-HEA/silica composite. The silica content, calculated assuming complete TEOS hydrolysis/polycondensation to $SiO_2$, was 10% wt referred to the composite.

Step iii) Coating of a Glass Substrate with the Hybrid VDF-HEA/Silica Composite

The solution obtained from step ii) was casted with a Doctor Blade system on a glass plate; the solvent was removed at 120° C. under vacuum for 2 hours. The resulting film was smooth and homogeneous. Film thickness was found to be about 30-40 μm.

Adhesion among glass substrate and hybrid composite film was determined according to ISO 2409 standard.

Data obtained for film of example 1, as well as for a film made of a hybrid composite comprising 30% of silica (assuming complete TEOS conversion) are given in Table 1, in combination with comparative data obtained from a film of VDF-HEA (from ex. 11) alone), for a film of a PVDF homopolymer (SOLEF® 6010 PVDF, commercially available from Solvay Solexis S.p.A.) and for hybrid composites obtained following same procedure as under 1 B) herein above from said PVDF homopolymer and various amounts of TEOS.

TABLE 1

| Ex. | | ISO 2409 |
|---|---|---|
| 1 | Hybrid VDF-HEA + 10% $SiO_2$ | 0 |
| 2 | Hybrid VDF-HEA + 20% $SiO_2$ | n.a. |
| 3 | Hybrid VDF-HEA + 30% $SiO_2$ | 0 |
| 4 comp | VDF-HEA copolymer | 4 |
| 5 comp | SOLEF ® 6010 PVDF + 10% $SiO_2$ | 5 |
| 6 comp | SOLEF ® 6010 PVDF + 20% $SiO_2$ | n.a. |
| 7 comp | SOLEF ® 6010 PVDF + 30% $SiO_2$ | 5 |
| 8 comp | SOLEF ® 6010 PVDF | 5 |

Under ISO 2409 standard, rating ranges from 0 (complete adhesion) to 5 (no adhesion at all).

Only hybrids of the invention made by reaction of the metal alkoxyde and the hydroxylalkyl-acrylate-containing fluoropolymer have been found to provide for outstanding adhesion performances.

Sol-gel reaction on the VDF homopolymer has been shown not to provide any improvement in adhesion to glass.

Mechanical properties of films obtained as described above were evaluated according to ASTM D-638 type V standard, by measuring tensile properties at an elongation rate of 1/50 mm/min. Results are summarized in Table 2.

TABLE 2

| Ex. | $SiO_2$ (% wt) | Modulus [Mpa] | Yield Stress [Mpa] | Yield Strain [%] | Stress at break [Mpa] |
|---|---|---|---|---|---|
| 1 | 10 | 1786 | 47 | 4.4 | 42 |
| 2 | 20 | 1985 | 53 | 4.4 | 50.8 |
| 3 | 30 | 2833 | — | — | 44.4 |
| 4 comp | 0 | 1546 | 45.2 | 4 | 43.2 |
| 5 comp | 10 | 1773 | 38.8 | 4 | 35.6 |
| 6 comp | 20 | 1508 | 27.5 | 5 | 26.3 |
| 7 comp | 30 | 1342 | 20.2 | 2.8 | 20.2 |
| 8 comp | 0 | 1792 | 53 | 4.9 | 52 |

Preparative Example 9

Step j) Manufacture of a E-CTFE-HPA Terpolymer

In an enameled autoclave equipped with baffles, and stirrer working at 450 rpm, 3 l of demineralized water, 52.5 g of chloroform, 35 ml of a solution of hydroxypropylacrilate (HPA) (40% volume) and water (60% volume) and 7 kg of chlorotrifluoroethylene were introduced. Then the temperature was brought to 15° C. and ethylene was fed up to a pressure of 8.2 absolute bars. In the autoclave the radical initiator was then continuously fed during the polymerization under a form of a solution, maintained at −17° C., of trichloroacetylperoxide (TCAP) in isooctane having a titre of 0.12 gTCAP/ml. Furthermore 35 ml of the solution of hydroxypropylacrylate and water were fed at consumption of 20, 40, 60, 80, 100, 120, 140, 160, and 180 g of ethylene.

The pressure was maintained constant during 345 min, by continuously feeding ethylene to the reactor up to a consumption of 200 g.

The product discharged from the autoclave was dried at 120° C. for about 16 hours. 1563 g of a polymer having a melting point of 177.6° C., a MFI (220° C./2.16 Kg) of 0.375 g/10 min and a molar composition E/CTFE/HPA of 40/55/5 were so obtained.

Step jj) Manufacture of a Hybrid E-CTFE-HPA/Silica Composite

NMP (90 g) and terpolymer of step j) (10 g) were introduced under inert atmosphere in a glass round bottom flask equipped with two necks, equipped with a glass condenser; after heating at 140° C. for 1 hour under stirring (500 rpm), a homogeneous solution having a concentration of 10% by weight was obtained.

After cooling down to 120° C., TEOS (3.85 g, 18.5 mmol) was added drop-wise, followed by 0.67 g of an aqueous solution of HCl 0.07 mol/L. Reaction mixture was maintained at 120° C. for one hour to obtain a clear solution of the hybrid E-CTFE-HPA/silica composite.

Step jjj) Coating of a Glass Substrate with the Hybrid E-CTFE-HPA/Silica Composite A temperate glass plate (25 cm×15 cm) was installed in a motorized film applicator (Elcometer 4344/11) equipped with an electrical heating system and heated to maintain the temperature on the glass surface at 120° C. 10 g of the solution obtained from step jj) were poured onto the glass plate and cast into a thin film (1.25 mm) with the help of a casting-knife. The glass plate was removed from the applicator and placed in an oven at 120° C. for 90 minutes, allowing the film to dry.

For evaluating adhesion, coated glass plate was dipped in a water bath at 40° C. for one day and then attempts to detach the film from the glass were made. Failure to detach, despite the aid of a very thin knife, demonstrated outstanding adhesion.

Comparative Preparative Example 10

Step k) Manufacture of a ECTFE Polymer

In an industrial reactor an ECTFE copolymer having approximately a molar composition of 43% E and /57% CTFE was synthesized at a temperature of 15° C. and 7.2 absolute bar of pressure. The polymer obtained was found to have a melting point of 185° C., a MFI (220° C./2.16 Kg) of 1.4 g/10 min and a solubility in NMP at 120° C. of 23% w/w.

Step kk) Manufacture of a Hybrid E-CTFE/Silica Composite

Same procedure as under step jj) of example 9 was followed, but using 10 g of the ECTFE copolymer from step k). A turbid and highly viscous solution was obtained.

Step kkk) Coating of a Glass Substrate with the Hybrid E-CTFE/Silica Composite Same procedure as above described under step jjj) in example 9 was followed for attempting to prepare the coated glass plate, but using the solution obtained from step kk) herein above.

In these conditions, the solution partially solidified during casting, so than no dense film was actually obtained.

Preparative Example 11

Step I) Manufacture of the VDF-HEA Copolymer

Same copolymer as in example 1i) was used.

Step II) Manufacture of a Hybrid VDF-HEA/Silica/Clay Composite

A nano-dispersion of Laponite RD in water was obtained mixing 2.6 g of deionized water with 0.056 g of Laponite RD powder by sonication at room temperature for 90 min.

Laponite RD is a synthetic hectorite sold by LAPORTE company, having the following average agglomerated particle distribution: 0.7 percent 600 micron, 7.3 percent in the range 500-250 micron, 52.6 percent in the range 250-106 micron, 39.4 percent 75 micron, and wherein lamellar elementary inorganic particles have an average thickness of about 1 nm and an average length of 50 nm measured by AFM (Atomic Force Microscopy).

The gel obtained was diluted by addition of 40 g of NMP and further sonication for 30 min at room temperature and 30 min at 60° C., until obtaining a clear and homogenous liquid composition.

5 g of VDF-HEA copolymer as above detailed were added to the mixture and allowed to dissolve under stirring at 60° C. for one hour. Then, TEOS (1.93 g, 9.25 mmol) was added drop-wise, followed by 0.33 g of an aqueous HCL solution (0.07 mol/L). Reaction mixture was heated under stirring at 60° C. for 2 hours for obtaining a hybrid VDF-HEA/silica/clay composite.

Step III) Coating of a Glass Substrate with the Hybrid VDF-HEA/Silica/Clay Composite A thick film (500 μm thickness) was cast from the mixture from step II) on a glass plate (10 cm×15 cm) by using a manual casting knife. The film was dried in an oven at 120° C. for one hour and detached from the glass plate, with the aid of a water bath at room temperature.

The film consisted of about 1% by weight of Laponite RD, 10% by weight of silica from TEOS reaction and 89% by weight of the VDF-HEA copolymer. The film was tested according to ASTM D638 to evaluate its tensile properties; results are summarized in Table 3 herein below. To the sake of comparison data for bare VDF-HEA copolymer and for the hybrid VDF-HEA/silica are also reminded.

TABLE 3

| Ex. | SiO$_2$ (% wt) | Modulus [Mpa] | Yield Stress [Mpa] | Yield Strain [%] | Stress at break [Mpa] |
|---|---|---|---|---|---|
| 1 | 10 | 1786 | 47 | 4.4 | 42 |
| 4 comp | 0 | 1546 | 45.2 | 4 | 43.2 |
| 11 | 10 | 1880 | 51.2 | 4.9 | 44.4 |

Preparative Example 12

Step m) Manufacture of the VDF-HEA Copolymer

Same copolymer as in example 1i) was used.

Step mm) Manufacture of a Hybrid VDF-HEA/Titania Composite

A solution of the VDF-HEA copolymer as above detailed (7.5 g) in NMP (67.5 g) was prepared by stirring the same at room temperature for 4 hours.
Titanium tetraisopropoxide (Ti(OC$_3$H$_7$)$_4$) (2.17 g, equivalent to a weight ration 10/90 TiO$_2$/VDF-HEA) were slowly poured to said solution, with nearly instantaneous increase of the viscosity of the solution, until formation of a solid gel.

Comparative Preparative Example 13

Step n) Manufacture of a PVDF Homopolymer

SOLEF® 6010 PVDF, commercially available from Solvay Solexis S.p.A. was used.

Step nn) Manufacture of a Hybrid PVDF/Titania Composite

Same procedure as above under ex. 12 mm) was followed but using SOLEF® 6010 PVDF instead of the VDF-HEA copolymer. No viscosity increase nor formation of gel was evidenced as indication of a chemical reaction between the polymer and the titanate.

Preparative Example 14

Step o) Manufacture of the VDF-HEA Copolymer

Same copolymer as in example 1i) was used.

Step oo) Manufacture of a Hybrid VDF-HEA/Silica/Functionalized Silica Composite 1.8 grams of VDF-HEA powder polymer were dissolved in 16.2 grams of NMP. Then 0.693 grams of TEOS and 1.081 grams of a 2-(4-chlorosulfonylphenyl)ethyltrimethoxysilane (CSPTMS) solution (50% in CH$_2$Cl$_2$) were added drop-wise under stirring, followed by 0.333 ml of aqueous HCl solution (0.1 M); mixture was heated at 60° C. for 2 hours to ensure the sol-gel reaction. A solution of a hybrid VDF-HEA/silica/functionalized silica composite having weight ratio 85/10/5 (assuming complete hydrolysis and polymerization of TEOS and CSPTMS) was obtained.

Step ooo) Casting of a Film of a Hybrid VDF-HEA/Silica/Functionalized Silica Composite The resulting solution was casted with a Doctor Blade system on a glass plate, and solvent was removed at 120° C. under vacuum for 2 hours.

The resulting film was smooth, homogeneous, and opaque. Film thickness was about 30-40 μm.

Preparative Example 15

Step p) Manufacture of the VDF-HEA Copolymer

Same copolymer as in example 1i) was used.

Step pp) Manufacture of a Hybrid VDF-HEA/Functionalized Silica Composite

Same procedure as detailed above under example 14 nn) was followed but using 2.162 g of CSPTMS solution (50% in CH$_2$Cl$_2$) without any TEOS addition. A solution of a hybrid VDF-HEA/functionalized silica composite having weight ratio 90/10 (assuming complete hydrolysis and polymerization of CSPTMS) was obtained.

Step ppp) Casting of a Film of a Hybrid VDF-HEA/Functionalized Silica Composite

The resulting solution was casted with a Doctor Blade system on a glass plate, and solvent was removed at 120° C. under vacuum for 2 hours.

The resulting film was smooth, homogeneous, and opaque. Film thickness was about 30-40 μm.

Swelling Measurements in Water

The extent of swelling (Sw) of composite polymer films were determined by soaking a small sample of film in water at room temperature (about 20° C.) for 1 h, 2 h and 5 h.

The percentage of swelling was determined using the following equation:

$$S_w = \frac{W - W_0}{W_0} \times 100$$

wherein W$_0$ is the weight of dried film and W is the weight of swelled film.

Results for films obtained from examples 14 to 16, and for film from example 1, as above detailed, are summarized in table 4 herein below.

TABLE 4

| Ref. | SiO$_2$ origin | % | Functionalized SiO$_2$ origin | % | Swelling 1 h, % |
|---|---|---|---|---|---|
| Ex. 1 | TEOS | 10 | — | 0 | 2.2 |
| Ex. 14 | TEOS | 10 | CSPTMS | 5 | 14.3 |
| Ex. 15 | — | 0 | CSPTMS | 10 | 33.0 |

Swelling and Conductivity Measurements in Electrolyte Solution

Small samples of the film were dipped in electrolyte solution, LiPF6 1M in EC/PC 1/1 weight, at room temperature in a dry glove-box for 24 hours, so to reach the equilibrium. The resulting polymer electrolyte was put between two stainless steel electrodes and sealed in a container. The resistance of the polymer electrolyte was measured and the ionic conductivity via "insert" "symbol" "σ" was obtained using the following equation $$\sigma = \frac{d}{(R_b \times S)}$$

wherein d is the thickness of the film, Rb the bulk resistance and S is the area of the stainless steel electrode.

Results for films obtained from examples 14 and 15, and for film from example 1, as above detailed, are summarized in table 5 herein below.

TABLE 5

| Ref. | SiO₂ origin | % | Functionalized SiO₂ origin | % | Swelling 24 h, % | Conductivity, S/cm |
|---|---|---|---|---|---|---|
| Ex. 1 | TEOS | 10 | — | 0 | 31% | $2.1 \times 10^{-7}$ |
| Ex. 14 | TEOS | 10 | CSPTMS | 5 | 30% | $5.4 \times 10^{-6}$ |
| Ex. 15 | — | 0 | CSPTMS | 10 | 51% | $9.6 \times 10^{-6}$ |

The invention claimed is:

1. A fluoropolymer hybrid organic/inorganic composite comprising inorganic domains, said hybrid organic/inorganic composite being obtained by reaction between:

at least one polymer (F), said polymer (F) comprising:

(a') at least 60% by moles of vinylidene fluoride (VDF);

(b') optionally from 0.1 to 15% by moles of a fluorinated comonomer selected from the group consisting of vinylfluoride (VF₁), chlorotrifluoroethylene (CTFE), hexafluoropropene (HFP), tetrafluoroethylene (TFE), trifluoroethylene (TrFE), perfluoromethylvinylether (PMVE) and mixtures thereof; and (c) from 0.05 to 10% by moles of monomer (MA), wherein monomer (MA) is a (meth)acrylic monomer of formula:

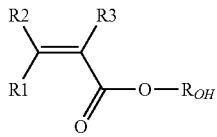

wherein each of R1, R2, R3, equal or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group; and at least one metal compound [compound (M)] of formula:

$X_{4-m}AY_m$ wherein m is an integer from 1 to 4, A is a metal selected from the group consisting of Si, Ti and Zr, Y is a hydrolysable group, X is a hydrocarbon group, optionally comprising one or more functional groups;

wherein said inorganic domains are grafted to polymer (F) through reaction of at least a fraction of the $R_{OH}$ groups of monomer (MA) with at least a fraction of compound (M).

2. The fluoropolymer hybrid organic/inorganic composite of claim 1, wherein monomer (MA) is selected from the group consisting of:

hydroxyethyl acrylate (HEA) of formula:

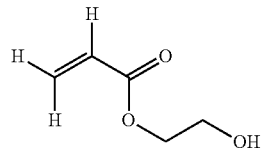

2-hydroxypropyl acrylate (HPA) of either of formula:

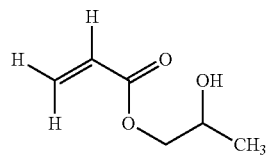

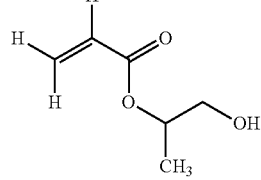

acrylic acid (AA) of formula:

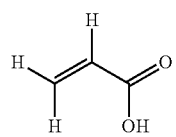

and mixtures thereof.

3. The fluoropolymer hybrid organic/inorganic composite of claim 1, wherein metal compound [compound (M)] complies with formula:

$R'_{4-m'}E(OR'')_{m'}$ wherein m' is an integer from 1 to 4,

E is a metal selected from the group consisting of Si, Ti and Zr, and

R' and R", equal to or different from each other and at each occurrence, are independently selected from $C_{1-18}$ hydrocarbon groups, optionally comprising one or more functional groups.

4. The fluoropolymer hybrid organic/inorganic composite of claim 3, wherein metal compound [compound (M)] complies with formula:

$R^A{}_{4-m*}E^*(OR^B)_{m*}$ wherein m* is an integer from 2 to 3,

E* is a metal selected from the group consisting of Si, Ti and Zr, $R^A$, equal to or different from each other at each occurrence, is a $C_{1-12}$ hydrocarbon group, optionally comprising one or more functional group; and $R^B$, equal to or different from each other at each occurrence, is a $C_1$-$C_5$ linear or branched alkyl radical.

5. The fluoropolymer hybrid organic/inorganic composites of claim 1, further comprising inorganic fillers comprised in said inorganic domains.

6. The fluoropolymer hybrid organic/inorganic composite of claim 1, wherein m is an integer from 1 to 3.

7. The fluoropolymer hybrid organic/inorganic composite of claim 1, wherein polymer (F-1) comprises one or more additional comonomers in an amount of 0.1 to 30% by moles, based on the total amount of TFE and/or CTFE and hydrogenated comonomer(s).

8. The fluoropolymer hybrid organic/inorganic composite of claim 1, wherein polymer (F) comprises:
  (a') at least 75% by moles of vinylidene fluoride (VDF);
  (b') from 0.1 to 12% by moles of a fluorinated comonomer selected from the group consisting of vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
  (c) from 0.1 to 7.5% by moles of monomer (MA).

9. The fluoropolymer hybrid organic/inorganic composite of claim 8, wherein polymer (F) comprises
  (a') at least 85% by moles of vinylidene fluoride (VDF);
  (b') from 0.1 to 10% by moles of a fluorinated comonomer selected from the group consisting of vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
  (c) from 0.2 to 3.0% by moles of monomer (MA).

10. A process for manufacturing the fluoropolymer hybrid organic/inorganic composite of claim 1, said process comprising:
  reacting at least a fraction of $R_{OH}$ groups of said monomer (MA) of said polymer (F) with at least a fraction of said compound (M) to obtain a grafted polymer comprising pendant —$Y_{m-1}AX_{4-m}$ groups; and
  hydrolyzing and/or polycondensing said compound (M) and/or said pendant —$Y_{m-1}AX_{4-m}$ groups to yield a fluoropolymer hybrid organic/inorganic composite comprising inorganic domains.

11. The process of claim 10, wherein polymer (F) and compound (M) are reacted in the molten state.

12. The process of claim 10, wherein polymer (F) and compound (M) are reacted in solution.

13. The process of claim 10, said mixture further comprising at least one inorganic filler.

14. A method of treating glass and/or ceramic materials comprising contacting the glass and/or ceramic materials with the fluoropolymer hybrid organic/inorganic composite of claim 1.

15. The method according to claim 14, wherein a surface of the glass and/or ceramic material is coated with a layer comprising the fluoropolymer hybrid organic/inorganic composite of claim 1.

16. A method for manufacturing multilayer structures, the method comprising bounding a glass and/or a ceramic substrate to a fluoropolymer layer comprising the fluoropolymer hybrid organic/inorganic composite of claim 1.

17. A membrane comprising the fluoropolymer hybrid organic/inorganic composite of claim 1.

18. A photovoltaic or organic light emitting device comprising the fluoropolymer hybrid organic/inorganic composite of claim 1 as electroluminescent material.

19. The process of claim 11, said mixture further comprising at least one inorganic filler.

20. The process of claim 12, said mixture further comprising at least one inorganic filler.

* * * * *